(12) United States Patent
Behrens

(10) Patent No.: US 7,673,944 B2
(45) Date of Patent: Mar. 9, 2010

(54) BACKREST FRAME FOR A REAR SEAT OF A VEHICLE AND A METHOD FOR PRODUCING THE FRAME

(75) Inventor: Meinhard Behrens, Obernkirchen (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 764 days.

(21) Appl. No.: 11/346,313

(22) Filed: Feb. 3, 2006

(65) Prior Publication Data

US 2006/0175887 A1    Aug. 10, 2006

(30) Foreign Application Priority Data

Feb. 4, 2005    (DE) .................. 10 2005 005 485

(51) Int. Cl.
*A47C 7/02*    (2006.01)
(52) U.S. Cl. ...................... 297/452.18; 297/452.36
(58) Field of Classification Search ............ 297/452.18, 297/452.2, 452.38, 452.36, 452.55
See application file for complete search history.

(56) References Cited

U.S. PATENT DOCUMENTS

| | | | | |
|---|---|---|---|---|
| 3,695,707 | A | * | 10/1972 | Barecki et al. ......... 297/452.55 |
| 4,834,451 | A | * | 5/1989 | Meunier et al. .......... 297/218.2 |
| 5,626,396 | A | * | 5/1997 | Kuragano et al. ........ 297/452.2 |
| 5,671,976 | A | * | 9/1997 | Fredrick ................ 297/452.18 |
| 5,676,423 | A | * | 10/1997 | Pedronno et al. ......... 297/378.1 |
| 5,749,135 | A | * | 5/1998 | Crane et al. ................ 29/415 |
| 5,810,446 | A | * | 9/1998 | Tadokoro ............... 297/452.18 |
| 5,921,606 | A | | 7/1999 | Moradell et al. |
| 5,997,090 | A | | 12/1999 | Baloche et al. |
| 6,260,924 | B1 | | 7/2001 | Jones et al. |
| 6,336,679 | B1 | | 1/2002 | Smuk |
| 6,981,748 | B2 | | 1/2006 | Garnweidner et al. |

(Continued)

FOREIGN PATENT DOCUMENTS

DE    90 11 486.8    11/1990

(Continued)

OTHER PUBLICATIONS

German Office Action dated Dec. 16, 2005 in German Application No. 10 2005 005 485.4, filed Feb. 4, 2005 (3 pages).

*Primary Examiner*—Milton Nelson, Jr.
(74) *Attorney, Agent, or Firm*—Shlesinger, Arkwright & Garvey LLP

(57) ABSTRACT

Rear backrest frame for a rear backrest component of a vehicle seat, with at least one main plate, one left and one right lateral hat-shaped section extending vertically, one upper and one lower hat-shaped section extending in a transverse direction, and the hat-shaped sections are welded to the front surface of the main plate. The rear backrest frame has cushion channels on its lateral edges and its upper and lower edges, for attachment of a cushion and/or cover. In order to enable a secure mounting of the backrest cushion and/or cover and a cost-effective, flexible production with a wide range of possible variants, it is provided that the hat-shaped sections are rectilinear in configuration, the lateral hat-shaped sections are welded to the hat-shaped sections that extend in a transverse direction, and the lateral cushion channels are formed on the lateral hat-shaped sections. Further, a corresponding production process is provided.

15 Claims, 4 Drawing Sheets

U.S. PATENT DOCUMENTS

| | | |
|---|---|---|
| 7,066,552 B2 * | 6/2006 | Yoshida ................ 297/452.18 |
| 7,114,779 B2 | 10/2006 | Thiel et al. |
| 7,390,063 B2 | 6/2008 | Behrens |
| 7,410,219 B2 | 8/2008 | Kraft et al. |
| 7,416,254 B2 | 8/2008 | Jennings |
| 2004/0075404 A1 | 4/2004 | Gerding |
| 2006/0055224 A1 | 3/2006 | Wanke |
| 2006/0061184 A1 | 3/2006 | Jennings |
| 2006/0108491 A1 | 5/2006 | Behrens |
| 2006/0119158 A1 | 6/2006 | Haverkamp |
| 2006/0138842 A1 | 6/2006 | Behrens |
| 2006/0163932 A1 | 7/2006 | Bej |

FOREIGN PATENT DOCUMENTS

| | | |
|---|---|---|
| DE | 42 01 829 A1 | 6/1993 |
| DE | 44 00 911 A1 | 8/1994 |
| DE | 44 44 122 C1 | 4/1996 |
| DE | 196 35 740 A1 | 3/1997 |
| DE | 196 00 789 C2 | 7/1997 |
| DE | 297 07 562 U1 | 10/1997 |
| DE | 42 16 584 C2 | 7/1998 |
| DE | 197 24 554 A1 | 12/1998 |
| DE | 197 13 753 C2 | 2/2000 |
| DE | 198 82 413 T1 | 5/2000 |
| DE | 698 00 455 T2 | 6/2001 |
| DE | 100 26 530 A1 | 12/2001 |
| DE | 101 42 981 A1 | 3/2003 |
| DE | 101 60 929 A1 | 7/2003 |
| DE | 102 30 637 A1 | 1/2004 |
| DE | 103 01 283 B3 | 1/2004 |
| DE | 102 40 042 A1 | 3/2004 |
| DE | 103 01 283 B3 | 7/2004 |
| DE | 102 40 042 A1 | 11/2004 |
| DE | 103 15 375 A1 | 11/2004 |
| EP | 0 901 934 A1 | 3/1999 |
| EP | 1 046 541 A1 | 10/2000 |
| JP | 10147166 A | 6/1998 |
| JP | 2001097099 A | 4/2001 |
| WO | 99/38723 | 8/1999 |
| WO | 01/89875 A1 | 11/2001 |

* cited by examiner

B-B

BACKREST FRAME FOR A REAR SEAT OF A VEHICLE AND A METHOD FOR PRODUCING THE FRAME

CROSS-REFERENCE TO RELATED APPLICATIONS

This application claims priority of German Application No. 10 2005 005 485.4, filed Feb. 4, 2005, and which is incorporated herein by reference.

FIELD OF INVENTION

The invention relates to a backrest frame. More particularly, the invention relates to a rear seat backrest frame for a rear backrest component of a vehicle seat, with at least one main plate, a left and right vertically extending lateral hat-shaped section, one upper and one lower transversely extending hat-shaped section, the hat-shaped sections are welded to the front surface of the main plate, and the rear backrest frame has cushion channels on its lateral edges and its upper and lower edges, for attachment of a cushion and/or cover, and a method for producing the backrest frame.

BACKGROUND OF THE INVENTION

One rear seat backrest frame of this type is known from WO 01/89875 A1. It is comprised of several backrest frame elements, each of which is assembled in a modular fashion from specially designed modular components and standard modular components. The corner regions of each backrest frame component are formed by specially designed modular components, between which standard modular components, if necessary combined with specially designed modular components, are installed in a vertical orientation, and standard modular components are installed in a horizontal orientation. To construct a wider backrest frame component, a vertically extending center support is also provided, to which standard modular components are attached on both sides, extending in a transverse direction.

U.S. Pat. No. 6,260,924 B1 describes a modular rear bench-type seating system with two backrest frame elements, in each of which the back plate and the upper hat-shaped section or the upper cross member are designed to form a single piece. Vertically extending plates are also attached at the sides.

DE 101 42 981 A1 describes a backrest cushion support for a vehicle seat comprising a main plate and a reinforcement frame that partially encompasses the plate and is modular in design. In this case the essentially U-shaped reinforcement frame, which is open toward the base, is provided with intentional separation points, at which it can be partitioned and then reassembled in a different configuration. The lower regions of the outer vertical leg are provided as the separable section. To create a wider backrest frame component, a lower crossbar, and between the lower crossbar and the upper horizontal arm a vertical center rail can also be attached as reinforcement elements.

Modular systems of this type enable cost-effective production, as the backrest frames required for the various seats or seat types can be assembled from preset modules, if necessary by cutting them to size.

However known modular systems still require individual modules that are quite costly to produce, to some extent with complex shaped corner regions. In addition, the range of variants of backrest frame components that can be formed is limited; in particular, frequently only a single division of the rear bench-type seat is possible.

Furthermore, the attachment of the cushion and/or the cover requires additional mounting elements, which must be separately constructed or attached. Thus to some extent quite complex shapings and tools that must be specially designed for this purpose are necessary, as the width of backrest components varies—especially in the case of an asymmetrical partitioning of the rear bench-type seat or with different types of vehicles.

OBJECTS AND SUMMARY OF THE INVENTION

An object of the invention is to overcome the drawbacks of the prior art.

Another object of the invention is to provide a rear seat backrest frame that will allow a broad range of variants and a secure mounting of the backrest cushion and/or cover, and can be manufactured cost-effectively, flexibly and easily. Further, a suitable production method is to be provided.

This object is achieved with the inventive rear backrest frame for a rear backrest component of a vehicle seat, with at least one main plate, a left and right vertically extending lateral hat-shaped section, one upper and one lower transversely extending hat-shaped section, the hat-shaped sections are welded to the front surface of the main plate, and the rear backrest frame has cushion channels on its lateral edges and its upper and lower edges, for attachment of a cushion and/or cover, and a method for producing the backrest frame.

The invention further includes a modular system, i.e. a set of modular elements, for constructing a rear backrest frame of this type.

The rear backrest frame and production method of the invention, and the modular system configured for use in this production method, enable individual adaptation for different rear backrest components without the cost of additional tools. Depending upon the required width of the backrest component, a standard main plate can be used in its standard width, or can be correspondingly narrowed, in which case only a single cut is necessary. The four hat-shaped sections, which serve to ensure a solid structure, are then welded to the main plate, either directly or once the main plate has been suitably shaped, i.e. cut to size if necessary; it is then necessary only to adjust the lengths of the upper and lower hat-shaped sections. In this case at least the lateral cushion channels are already formed in the hat-shaped sections.

The inventive rear backrest frame further includes that the hat-shaped sections are rectilinear in orientation, the lateral hat-shaped sections being weldable to the transversely extending hat-shaped sections, and the lateral cushion channels are formed on the lateral hat-shaped sections.

According to the invention, the upper and lower cushion channels can be formed in the upper and lower sides of the main plate—which may have been cut to size—in a uniform standard machine tool, for example they can be stamped, in which case the main plate with its variable width is fed into the standard machine tool without additional pre-machining. With this embodiment, the hat-shaped sections that extend in a transverse direction, for example those configured only as rectangular sections, differ from the lateral hat-shaped sections that are equipped with cushion channels. However, the two lateral hat-shaped sections and the two hat-shaped sections that extend in a transverse direction are produced in matching pairs, so that low manufacturing costs can be achieved. In all embodiments the hat-shaped sections can be manufactured from one standard semi-finished product, for example an extruded profile or rolled profile.

As an alternative to this, the upper and lower cushion channels may already be formed in the upper and lower hat-shaped sections, so that a standard hat-shaped section that may be shortened as needed can be used for all four hat-shaped sections, and can be welded to the main plate, which is flat, for example.

The headrest support rods can be inserted into receptacles formed in the upper hat-shaped section. Further fittings, for example seat belt receptacles, can be correspondingly mounted on the backrest frame.

The attachment of the four hat-shaped sections to one another is advantageously accomplished by positioning the flat upper sides of the upper and lower hat-shaped sections onto the lateral hat-shaped sections and then spot welding them.

According to the invention, especially with the formation of the upper and lower cushion channels in the main plate, a uniform mounting of a profile with the cover or cushion over the entire perimeter is ensured.

Below, the invention will be described in greater detail with reference to the attached drawings of a number of embodiments.

DETAILED DESCRIPTION OF THE INVENTION

Figure 3:
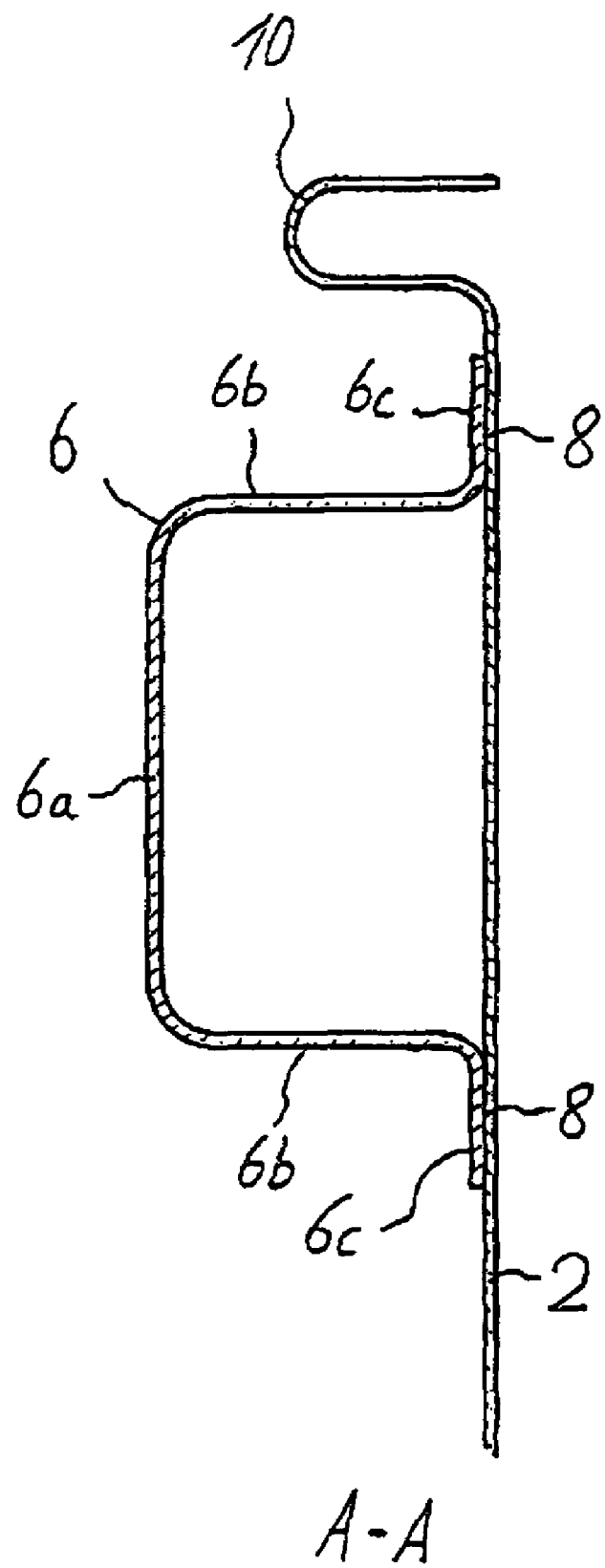
FIG. 3 is a section taken along line A-A of FIG. 1.
Figure 4:
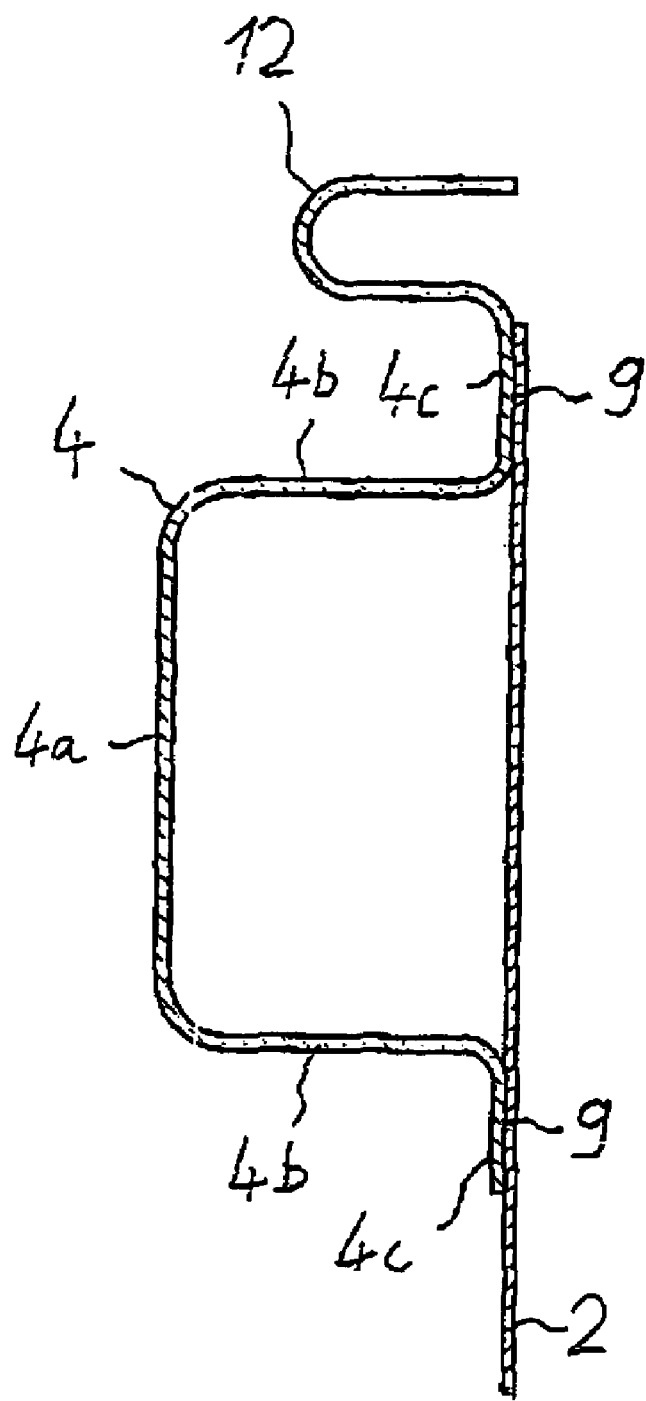
FIG. 4 is a section taken along line B-B of FIG. 1.

A rear backrest frame 1 for a rear backrest component of a vehicle seat includes a main plate 2, a left (in the direction of travel) lateral hat-shaped section 4, a right lateral hat-shaped section 5, an upper hat-shaped section 6 and a lower hat-shaped section 7. As shown in FIGS. 3 and 4 the hat-shaped sections 4, 5, 6, 7 are welded to the main plate 2 only at weld joints 8, 9, and form an outer, rectangular support structure into which the cushion or the foam component of the rear backrest can be installed from the front.

As shown in the cross-section of FIG. 3, the hat-shaped sections 6, 7 (this description can also be applied likewise to the hat-shaped section 7) preferably each have a rectangular or semi-enclosed shape, with an upper side 6a, 7a, sides 6b, 7b that extend at right angles from this, and bearing surfaces 6c, 7c or flanges that rest against the main plate 2. At both the upper outer end and the lower outer end of the main plate 2, a transversely extending cushion channel 10, 11 or molding channel is configured as a bent section that is open toward the back, below or above which the hat-shaped sections 6, 7 are positioned.

According to section B-B shown in FIG. 4 of the left hat-shaped section 4 (this description can also be applied accordingly to the right hat-shaped section 5), the vertically extending lateral hat-shaped sections 4, 5 are configured to comprise respectively, an upper side 4a, 5a, sides 4b, 5b, bearing surfaces 4c, 5c, and further a cushion channel 12, 13 that is configured to be open toward the back, with which the lateral hat-shaped sections 4, 5 extend somewhat beyond the main plate 2. At the respective ends of the transversely extending hat-shaped sections 6, 7, their upper sides 6a, 7a are extended and rest on the lateral hat-shaped sections 4, 5, to which they are attached by spot welding 15, for example, so that a solid support structure is formed by the hat-shaped sections 4, 5, 6, and 7.

The main plate 2 is thus configured as a plate with cushion channels 10, 11 or molding channels formed at its upper and lower ends, and unmachined side edges. The lateral hat-shaped sections 4, 5 are identical in configuration and are attached to one another in the same manner in reverse; the same applies also to the upper and lower hat-shaped sections 6, 7. In the upper hat-shaped section 6, two vertically extending, parallel headrest support sockets 14 are advantageously formed, into which headrest support rods for a headrest can be inserted from above. To accomplish this, holes can be bored or stamped correspondingly into the sides 6b.

Figure 1:
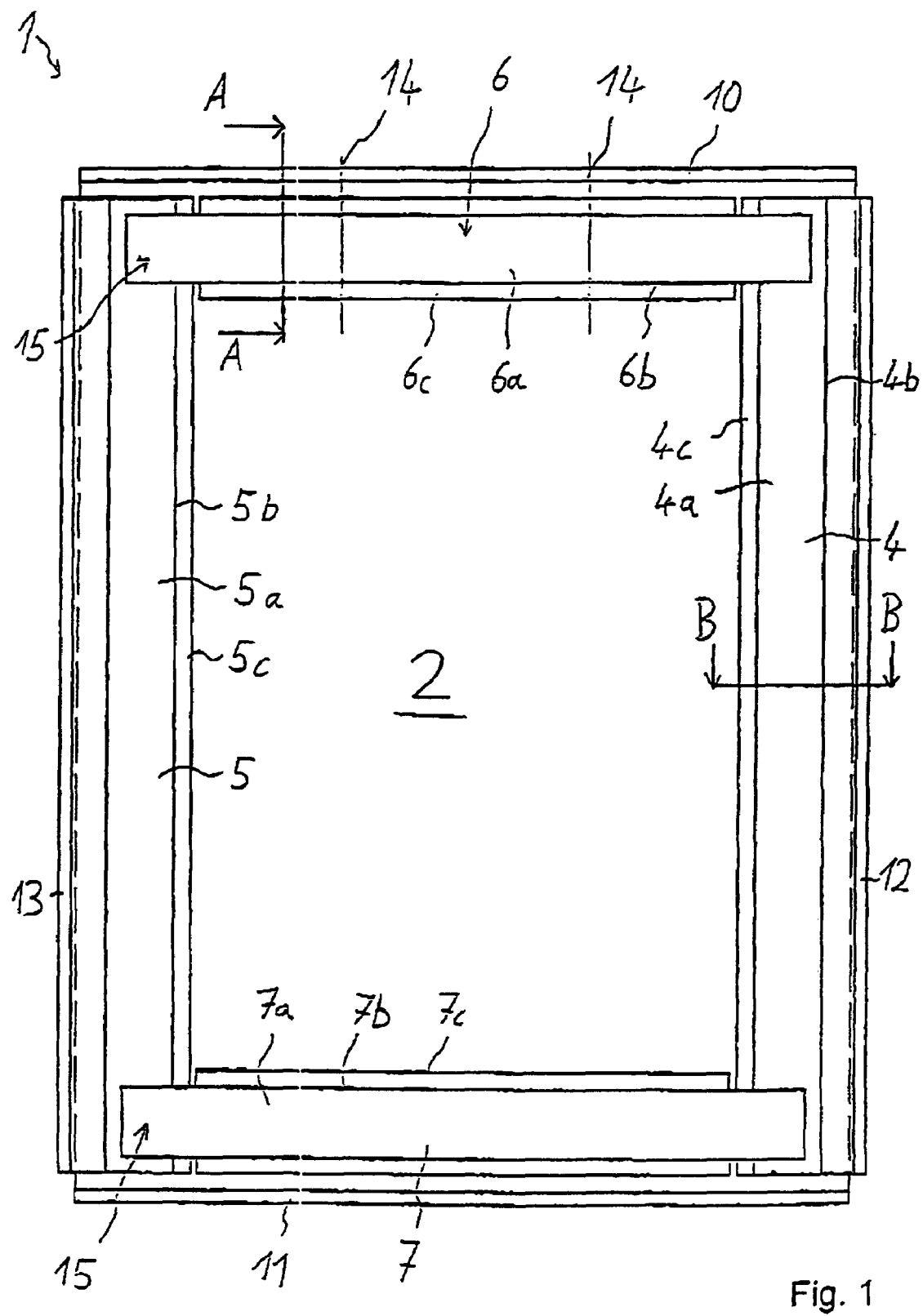
FIG. 1 is an elevation view of a rear backrest frame for a wide rear backrest component of the invention.
Figure 2:
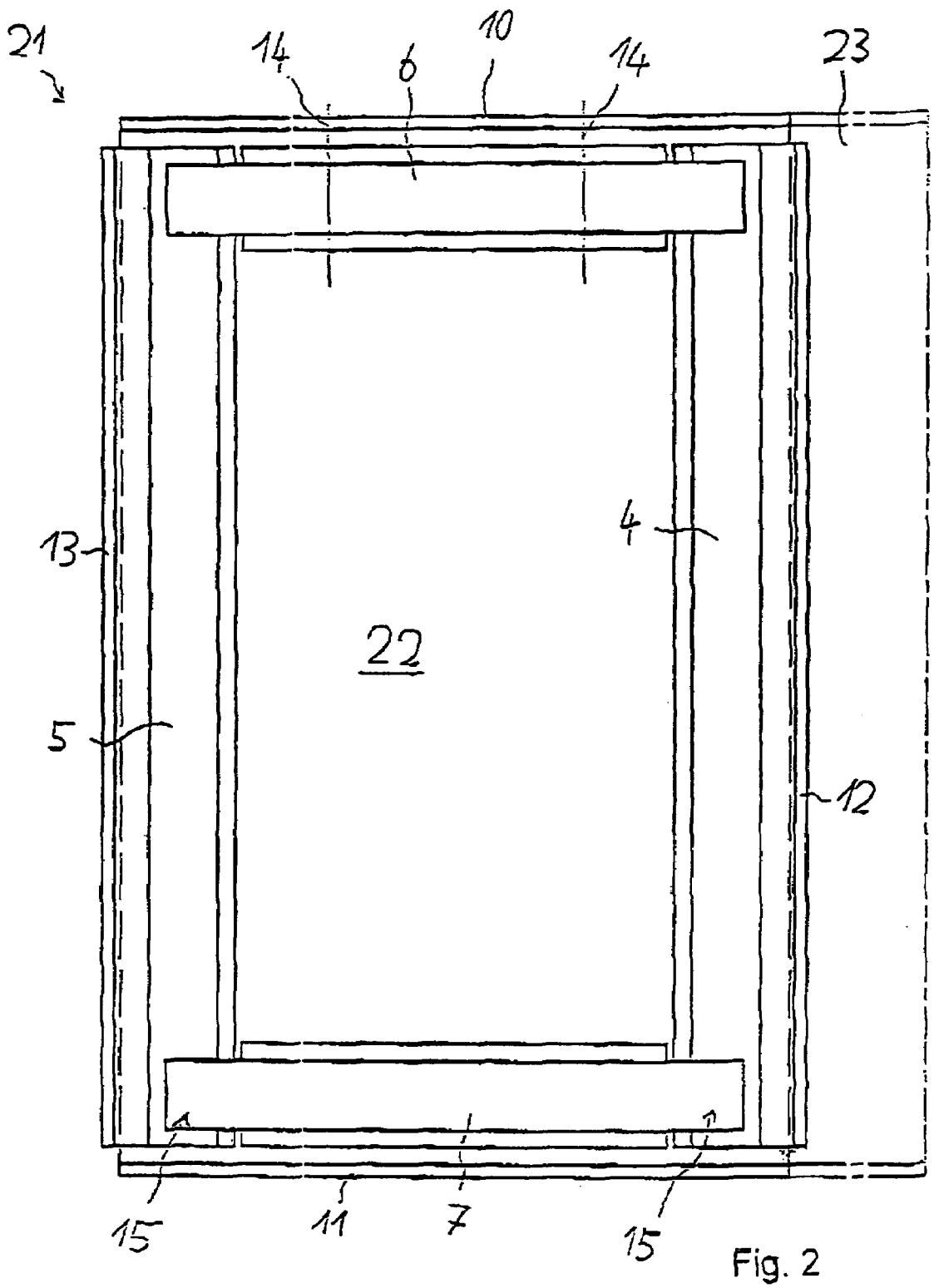
FIG. 2 is an elevation view of a rear backrest frame for a narrow rear backrest component.

FIG. 2 shows a narrower rear backrest frame 21, which has the same height and otherwise the same structure as the wide rear backrest frame 1 shown in FIG. 1, but is narrower in width. To produce this frame, a cut section 23 is removed from one side—using a single cut—from the (unmachined) standard sheet of the main plate 2 of FIG. 1, after which the cushion channels 10, 11 are formed, for example via stamping, in which process the same tool can be used as with the main plate 2 of FIG. 1. Furthermore, the upper and lower hat-shaped sections 6, 7 are cut to fit the adjusted length, so that afterward the rear backrest frame 21, the narrower main plate 22, the unaltered lateral hat-shaped sections 4, 5, and the narrower hat-shaped sections 6, 7 can be welded together as described above.

A shaping of all the hat-shaped sections 4, 5, 6, 7 with the profile shown in the section B-B of FIG. 4 is also possible, in which case the upper and the lower cushion channels 10, 11 are formed in the hat-shaped sections 6, 7. In this case the main plate 2, 22 is flat in configuration; the hat-shaped sections, 4, 5, 6, 7 are preferably made from a single type of semi-finished product; in this embodiment, if necessary, regions without cushion channels 10, 11 may be created in the corners of the rear backrest frame 1, 21, so that—in contrast to FIG. 1, 2—no molding channel that extends all the way around the perimeter is formed.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Rear backrest frame for a rear backrest component of a vehicle seat, the rear backrest frame comprising:
   a) a main plate having a front surface;
   b) a left and a right vertically extending lateral hat-shaped section;
   c) an upper and a lower transversely extending hat-shaped section, the hat-shaped sections being welded to the front surface of the main plate;
   d) cushion channels being provided on lateral edges and upper and lower edges of the main plate, the cushion channels being configured for attachment of one of a cushion and a cover;
   e) the hat-shaped sections being rectilinear in configuration, and the lateral hat-shaped sections being welded to the transversely extending hat-shaped sections; and
   f) the lateral cushion channels being formed on the lateral hat-shaped sections.

2. Rear backrest frame according to claim 1, wherein:
a) the left and the right hat-shaped sections have the same cross-section.

3. Rear backrest frame according to claim 2, wherein;
a) the left hat-shaped section and, the right hat-shaped section have the seine configuration and are attached to one another in a reverse arrangement on the main plate.

4. Rear backrest frame according to claim 1, wherein:
a) the upper and the lower hat-shaped sections have the same cross-section.

5. Rear backrest frame according to claim 4, wherein;
a) the upper hat-shaped section and the lower hat-shaped section have the seine configuration.

6. Rear backrest frame according to claim 1, wherein:
a) the hat-shaped sections each have a rectangular cross-section with an upper side and sides which are adjacent to the upper side and extend to the main plate.

7. Rear backrest frame according to claim 6, wherein;
a) the upper and lower hat-shaped sections are positioned between the lateral hat-shaped sections, and ends of their upper sides extend forward and rest against the upper sides of the lateral hat-shaped sections where they are welded in place.

8. Rear backrest frame according to claim 1, wherein:
a) the upper and lower cushion channels are formed in the main plate.

9. Rear backrest frame according to claim 8, wherein:
a) the cushion channels form a channel which extends all the way around a perimeter of the main plate.

10. Rear backrest frame according to claim 1, wherein:
a) the upper and the lower cushion channels are formed in the upper and lower hat-shaped sections.

11. Rear backrest frame according to claim 10, wherein:
a) the upper, lower, right and left hat-shaped sections are configured to have the sane cross-section.

12. Rear backrest frame according to claim 1, wherein:
a) a socket for a headrest support rod is formed in the upper hat-shaped section.

13. Modular system including the rear backrest frame according to claim 1, wherein:
a) the main plate, the two lateral hat-shaped sections, the one upper and the one lower hat-shaped section defining a modular system, and at least the lateral hat-shaped sections having the cushion channel configured for attachment of one of a cushion and a cover.

14. Modular system including the rear backrest frame according to claim 1, wherein:
a) the main plate, the two lateral hat-shaped sections, the one upper and the one lower hat-shaped section defining a modular system, and at least the lateral hat-shaped sections having the cushion channel configured for attachment of one of a cushion and a cover; and
b) the main plate is produced from a starting plate, and the starting plate is used as is.

15. Modular system including the rear backrest frame according to claim 1, wherein:
a) the main plate, the two lateral hat-shaped sections, the one upper and the one lower hat-shaped section defining a modular system, and at least the lateral hat-shaped sections having the cushion channel configured for attachment of one of a cushion and a covet; and
b) the main plate is produced from a starting plate, and the main plate is produced by cutting the starting plate.

\* \* \* \* \*